(12) United States Patent
Komata

(10) Patent No.: US 7,154,484 B2
(45) Date of Patent: Dec. 26, 2006

(54) RECORDING MEDIUM, COMPUTER AND METHOD FOR SELECTING COMPUTER DISPLAY ITEMS

(75) Inventor: Nobuhiro Komata, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 460 days.

(21) Appl. No.: 10/640,418

(22) Filed: Aug. 13, 2003

(65) Prior Publication Data

US 2004/0095313 A1 May 20, 2004

Related U.S. Application Data

(63) Continuation-in-part of application No. 09/757,815, filed on Jan. 10, 2001, now abandoned, and a continuation-in-part of application No. 09/758,031, filed on Jan. 10, 2001, now abandoned.

(30) Foreign Application Priority Data

Jan. 14, 2000 (JP) ............................... 2000-40264
Jan. 14, 2000 (JP) ............................... 2000-40265

(51) Int. Cl.
G09G 5/00 (2006.01)
(52) U.S. Cl. ...................... 345/173; 345/174; 345/175; 345/156; 345/179
(58) Field of Classification Search ................ 345/121, 345/173–179, 350, 901, 156–159, 145, 163; 178/18.01–18.05
See application file for complete search history.

(56) References Cited

U.S. PATENT DOCUMENTS

| | | | |
|---|---|---|---|
| 4,323,888 A | 4/1982 | Cole | |
| 4,633,416 A * | 12/1986 | Walker | ........................ 345/592 |
| 5,184,120 A | 2/1993 | Schultz | |
| 5,258,748 A | 11/1993 | Jones | |
| 5,485,171 A | 1/1996 | Copper et al. | |
| 5,640,152 A | 6/1997 | Copper | |
| 5,673,066 A | 9/1997 | Toda et al. | |
| 5,687,331 A | 11/1997 | Volk et al. | |
| 5,714,983 A | 2/1998 | Sacks | |
| 5,889,236 A | 3/1999 | Gillespie et al. | |
| 5,909,207 A * | 6/1999 | Ho | ............................... 345/156 |
| 5,943,044 A | 8/1999 | Martinelli et al. | |
| 6,097,371 A * | 8/2000 | Siddiqui et al. | ............. 345/164 |

(Continued)

FOREIGN PATENT DOCUMENTS

EP 0 854 414 A1 7/1998

(Continued)

OTHER PUBLICATIONS

Communication pursuant to Article 96(2) EPC dated Jul. 20, 2006, for corresponding European Application 01 901 360.6-1245.

(Continued)

Primary Examiner—Bipin Shalwala
Assistant Examiner—Prabodh Dharia
(74) Attorney, Agent, or Firm—Katten Muchin Rosenman LLP

(57) ABSTRACT

A recording medium, computer and method for displaying a selectable item on a computer display screen. The recording medium has a processing program that sequentially displays a selectable item from a sequence of items at a rate depending on the output from a controller which senses a pushing pressure of a user on a control element of the controller. The computer includes that controller, a display screen; a unit for determining a display rate based on a value of said pressure-sensing output, and a unit for sequentially displaying each of a plurality of items on the display screen as the selectable item at the display rate.

23 Claims, 20 Drawing Sheets

U.S. PATENT DOCUMENTS

| | | |
|---|---|---|
| 6,102,802 A | 8/2000 | Armstrong |
| 6,147,674 A | 11/2000 | Rosenberg et al. |
| 6,225,976 B1 | 5/2001 | Yates et al. |
| 6,322,448 B1 | 11/2001 | Kaku et al. |
| 6,347,997 B1 | 2/2002 | Armstrong |
| 6,400,353 B1 | 6/2002 | Ikehara et al. |
| 6,414,996 B1 | 7/2002 | Owen et al. |
| 6,424,336 B1 | 7/2002 | Armstrong |
| 6,424,338 B1 * | 7/2002 | Anderson .................. 345/173 |
| 6,518,952 B1 * | 2/2003 | Leiper ........................ 345/156 |
| 6,677,929 B1 * | 1/2004 | Gordon et al. .............. 345/156 |
| 6,717,568 B1 * | 4/2004 | Takatuka et al. ............ 345/156 |
| 6,943,776 B1 * | 9/2005 | Ehrenburg ................. 345/168 |
| 6,989,815 B1 * | 1/2006 | Liang et al. ................ 345/156 |
| 6,995,745 B1 * | 2/2006 | Boon et al. ................. 345/156 |
| 2001/0008397 A1 * | 7/2001 | Komata ....................... 345/156 |
| 2004/0075642 A1 * | 4/2004 | Kisliakov ................... 345/156 |

FOREIGN PATENT DOCUMENTS

TW      288636      10/1996

OTHER PUBLICATIONS

Boyce, et al., Inside Window 3.11, New Riders Publishing, Platinum Edition, pp. 87-89.

* cited by examiner

| PRESSURE-SENSE VALUE | TIME PER UNIT ITEM DISPLAY (NUMBER OF FRAMES Ft) |
|---|---|
| 0 | 0 |
| 1 | 255 FRAMES |
| ⋮ | ⋮ |
| 255 | 1 FRAME |

FIG. 3

| INDEX NUMBER IN | ITEM |
|---|---|
| $IN_0$ | X X X X X X X X |
| $IN_1$ | Y Y Y Y Y Y Y Y |
| $IN_2$ | Z Z Z Z Z Z Z Z |
| ⋮ | ⋮ |
| $IN_{max}$ | W W W W W W W W |

FIG. 4

RECORDING MEDIUM, COMPUTER AND METHOD FOR SELECTING COMPUTER DISPLAY ITEMS

CROSS-REFERENCE TO RELATED APPLICATION

The present application is a continuation-in-part of and claims priority under 35 U.S.C. § 120 from U.S. patent application Ser. No. 09/757,815, which was filed on Jan. 10, 2001 now abandoned, and from U.S. patent application Ser. No. 09/758,031, which was filed on Jan. 10, 2001 now abandoned. The disclosures of U.S. patent application Ser. Nos. 09/757,815 and 09/758,031 are hereby incorporated by reference.

FIELD OF THE INVENTION

This invention relates to a recording medium, computer and method for selecting computer display items intended to make the selection and entry of items by pushing cursor keys, return keys or other simple on/off switches by a user an easy-to-use interface for users.

BACKGROUND OF THE INVENTION

Among the methods of selecting and entering a desired item from a menu displayed upon a screen of a computer or a TV monitor, a basic method is the method typically adopted in computers. By this method, cursor keys are pushed by the user the same number of times as the number of items before the destination item, and when the cursor reaches the intended item, the return key is pushed to select and enter the intended item.

So-called pressure-sensitive type controllers may be used as input devices for computers, and as input devices for entertainment systems represented by game machines, for example. When pressure is applied with a finger of a user directly to a control element connected to a pressure-sensitive device of the controller, the pushing pressure is represented at an output as a pressure-sensing value. A specific example thereof is, for example, a pressure-sensitive type controller disclosed in the publication of examined Japanese utility model application No. JP-B-H1-40545, wherein a pressure-sensitive output is provided as an input to a VCO (variable control oscillator), and the output of the VCO is used to direct a repeated fire in a game.

SUMMARY OF THE INVENTION

It is an object of the present invention to make the selecting and entering of items by pushing cursor keys, return keys or other simple on/off switches an easier-to-use interface for users.

This and other objects of the present invention are attained by a disclosed method, computer and recording medium on which is recorded a computer-readable and executable software program that performs processing by: a) acquiring a pressure-sensing output from a controller having pressure sensitive means; b) determining a display rate for sequentially displaying selectable items on the screen, said display rate being dependent on a value of said pressure-sensing output; and c) sequentially displaying each of the plurality of items as the selectable item at the determined display rate.

A computer according to this invention comprises: a) a controller having pressure-sensitive means for sensing a pushing pressure of a user on the controller and generating a pressure sensing output, b) a display screen, c) means for monitoring the pressure-sensing output from the controller, d) means for determining a display rate for sequentially displaying selectable items on the display screen, said display rate being dependent on a value of said pressure-sensing output, and e) means for sequentially displaying each of the plurality of items on the display screen as the selectable item at the determined display rate.

A method of sequentially displaying each of a plurality of items as a selectable item on a screen of a computer according to this invention includes the steps of: a) acquiring a pressure-sensing output from a controller, said computer including the controller which has pressure-sensitive means, b) determining a display rate for sequentially displaying selectable items on the screen, said display rate being dependent on a value of said pressure-sensing output, and c) sequentially displaying each of the plurality of items as the selectable item at the determined display rate.

BRIEF DESCRIPTION OF THE DRAWING

A more complete understanding of the invention may be obtained by reading the following description of specific illustrative embodiments of the invention in conjunction with the appended drawing in which:

FIG. 3 is a table for selecting the number of frames depending on a pressure-sensed value;

FIG. 4 is a table for making index numbers correspond to display items;

DETAILED DESCRIPTION OF THE PREFERRED EMBODIMENT

Figure 1:
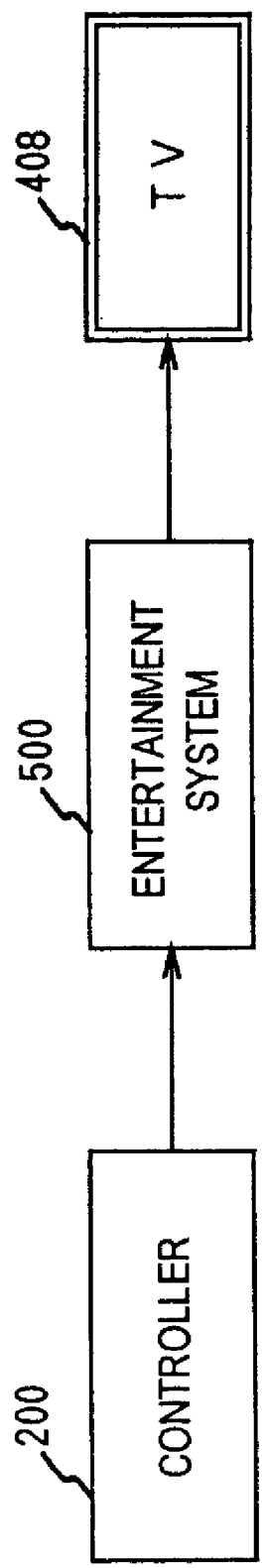
FIG. 1 is a schematic diagram of connecting an entertainment system to a TV monitor.

FIG. 1 shows an example of connecting a controller to an entertainment system 500 to enable a user to enjoy game software or video. A perspective view of an associated structure for entertainment system 500 is shown, for example, in FIG. 6.

As shown in FIG. 1, a controller 200 which has buttons (control elements) connected to pressure-sensitive devices is connected to entertainment system 500 used for playing games or enjoying DVD video or other types of video images, and video output terminals of entertainment system 500 are connected to a television monitor 408. Here, the analog output from the pressure-sensitive devices is converted by an A/D converter in controller 200 to digital values in the range 0–255 and provided to the entertainment system 500.

With reference to FIGS. 2–5, processes for displaying items and moving a cursor by the operation of a pressure-sensitive button of controller 200 will be described in detail. As shown in FIGS. 2A–2C, illustrating a process for displaying an item, different items are displayed one at a time in order. At a certain point in time, as shown in FIG. 2A, the item 21 "XXXXXXXX" is displayed. At a subsequent point in time, as shown in FIG. 2B, the item 22 "YYYYYYYY" is displayed. Moreover, at a further subsequent point in time, as shown in FIG. 2C, the item 23 "ZZZZZZZZ" is displayed.

For example, in order to select items to be displayed upon the screen of a personal computer or video game machine, it is conventionally necessary to push an on/off switch repeatedly a number of times equal to the number of items the cursor is to cross in order to select a desired item. In this case, a method is adopted whereby each of a plurality of items for display is first displayed simultaneously, and then one of the plurality of items is selected with a cursor Ca and then entered.

In contrast, according to the present invention, items prepared in advance are automatically displayed sequentially in the same region on the screen of the monitor at a rate depending on the magnitude of the pressure-sense value from a pressure-sensitive controller.

Figure 2A:
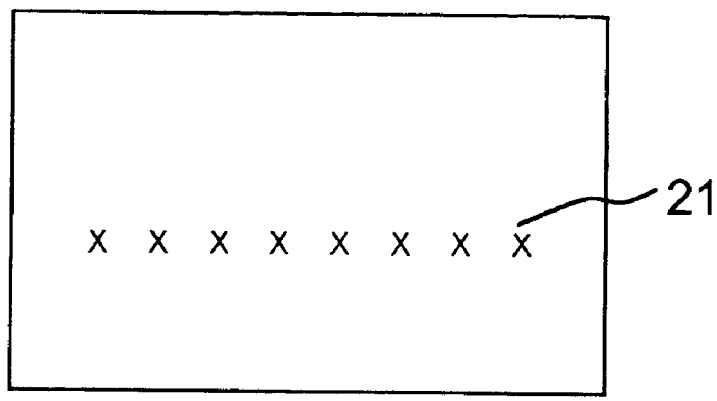
FIGS. 2A-2C illustrate a display on which different items are displayed by operating a controller of the computer.
Figure 2B:
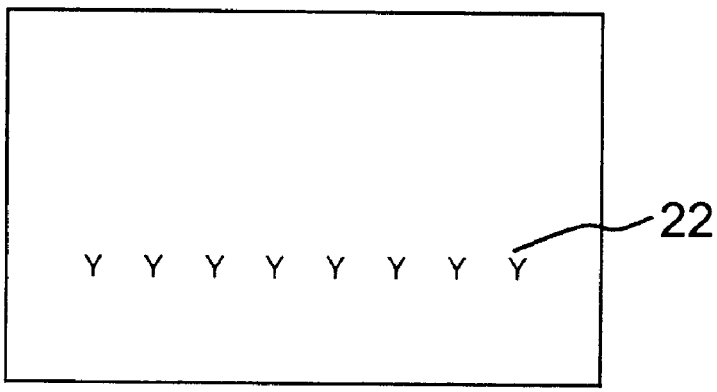
Figure 2C:
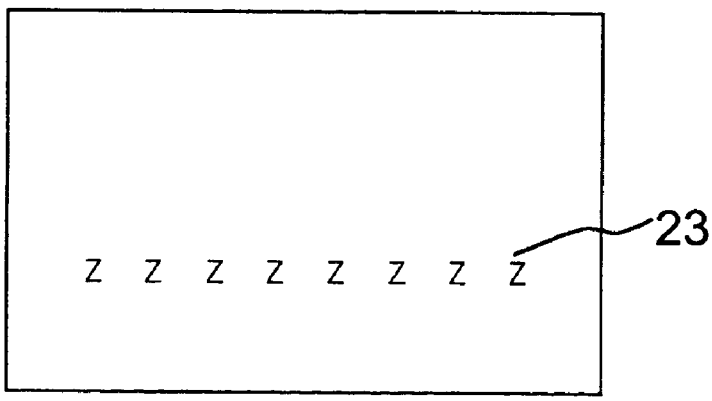
Figure 2D:
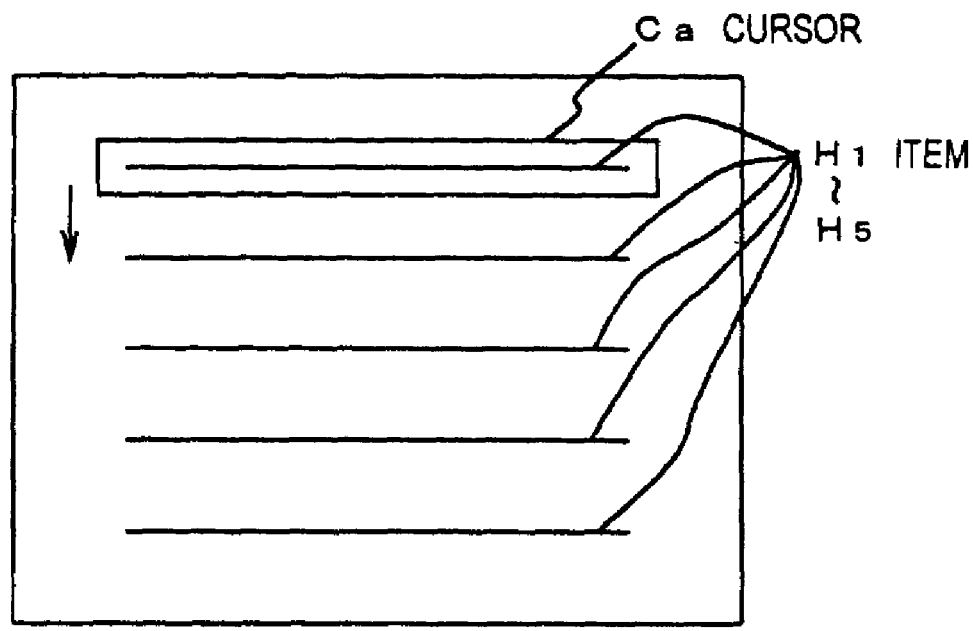
FIGS. 2D, 2E illustrate a display on which are positioned a menu and a cursor.
Figure 2E:
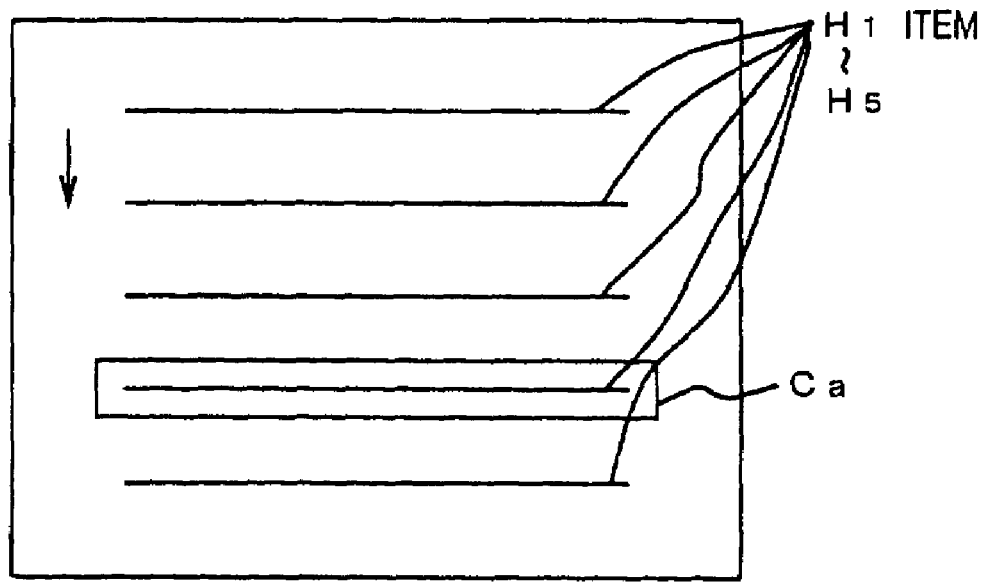

As shown in FIGS. 2D–2E, illustrating a process for moving a cursor, in order to select one item from a plurality of items H1 through H5 in a menu, the cursor Ca must be moved to select one of the items H1 through H5.

In the display shown in FIG. 2D, the cursor Ca lies upon item H1, but if it is moved by three items in the direction of the arrow, the cursor Ca will move to lie upon item H4 as in the display shown in FIG. 2E, so that item H4 is selected. For example, in order to select items displayed upon the screen of a personal computer or video game machine, it is conventionally necessary to push an on/off switch repeatedly a number of times equal to the number of items the cursor is to cross.

According to the present invention, the cursor Ca is moved automatically at a rate depending on the magnitude of the pressure-sensing value from the pressure-sensitive controller. It is noted that the same applies to the case wherein there is no cursor Ca. To wit, the same applies if the selected item is put into an alternate display (for example, if the selected item is highlighted).

FIG. 3 shows a table used to select the amount of time per unit movement, namely the number of frames Ft, for each of the pressure-sensing values 0–255. Here, a pressure-sensing value of "0" corresponds to a unit-movement number of frames Ft of "0 frames," a pressure-sensing value of "1" corresponds to a unit-movement number of frames Ft of "255 frames," . . . , and a pressure-sensing value of "255" corresponds to a unit-movement number of frames Ft of "1frame." Note that this pressure-sensing value-movement number of frames conversion table is merely an illustration, so naturally other conversion tables may also be adopted, such as one wherein the unit-movement number of frames decreases as the pressure-sensing value increases, for example.

In addition, FIG. 4 shows a table wherein the index numbers $IN_0$ through $IN_{max}$ correspond to the items "XXXXXXXX" through "WWWWWWWW" of FIGS. 2A–2C, respectively.

Figure 5A:
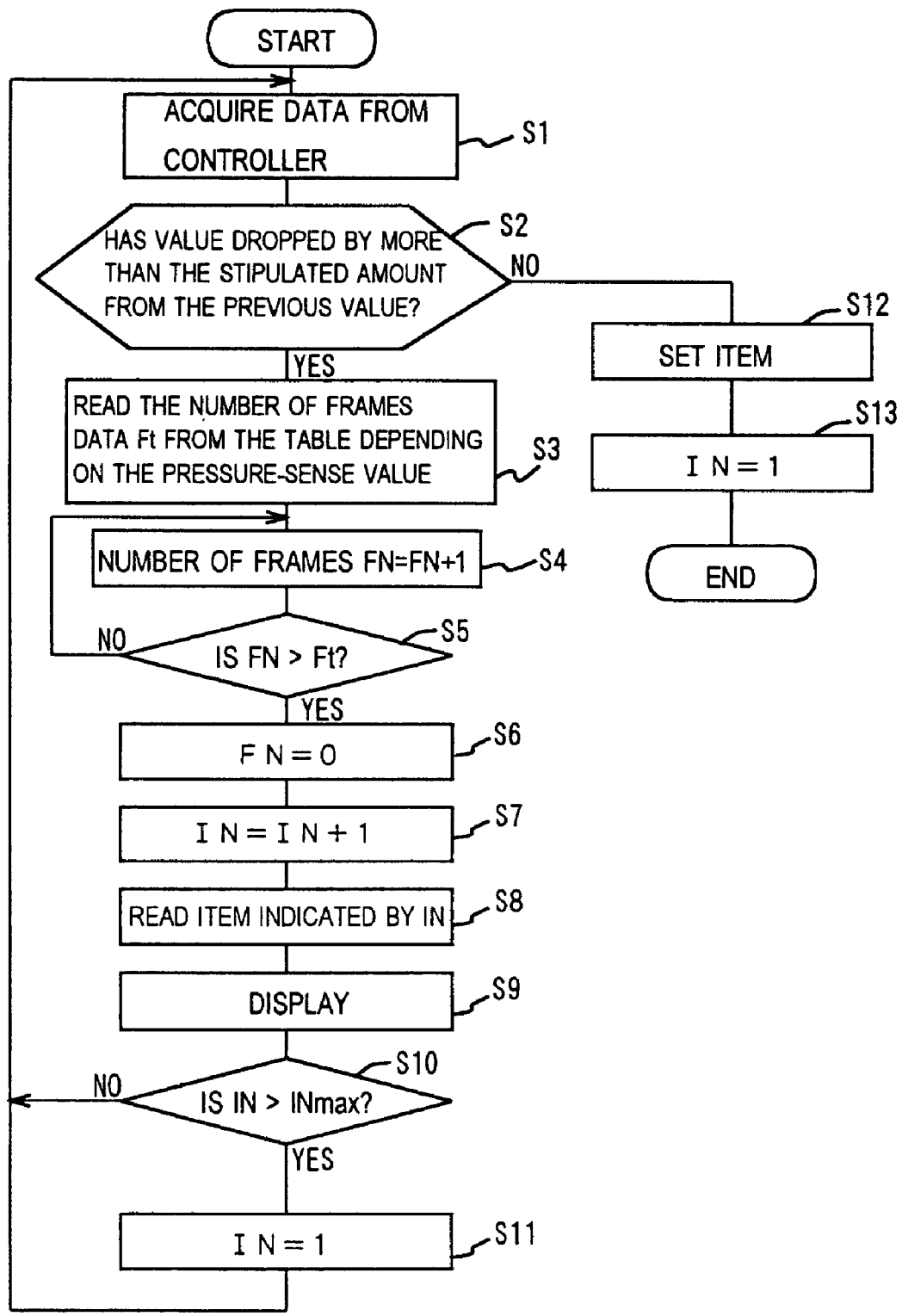
FIGS. 5A, 5B are flowcharts showing the processing of a program used for respectively displaying items and moving a cursor.

FIG. 5A shows the flowchart of the method of displaying items sequentially at a rate depending on the pressure-sensed value. The flowchart of FIG. 5A illustrates the processing of a program used for item display, and this program may be supplied either recorded alone on an optical disc or other recording medium, or recorded on the recording medium together with the game software as part of the game software.

This program is run by the entertainment system 500 and executed by its CPU. The meaning of supplying these programs recorded individually on a recording medium has the meaning of preparing them in advance as a library for software development. As is common knowledge, at the time of developing software, writing all functions requires an enormous amount of time. However, if the software functions are divided into single functions, for example, for moving objects and the like, they can used commonly by various types of software, so more functions can be included.

To this end, a function such as that described in this preferred embodiment that can be used commonly may be provided to the software manufacturer side as a library program. When general functions like this are supplied as external programs in this manner, it is sufficient for the software manufacturers to write only the essential portions of the software.

In Step S1, a pressure-sense value is acquired, and in Step S2 a decision is made as to whether or not the pressure-sensing value thus acquired is more than a stipulated amount below the pressure-sense value acquired previously, and if "YES" then control moves to Step S3 where the number of frames data Ft corresponding to the pressure-sensing value is read from the table shown in FIG. 3.

Here, we shall assume that the stipulated amount is 100, for example. Giving such a large difference means that the strength of pushing, namely the pressure-sense value, will have been greatly decreased, so this difference is transmitted to the entertainment system 500 as the will of the user to make a decision. If the aforementioned stipulated amount is set too small, the user may accidentally enter a displayed item if the user slightly lessens the pressing force on the button by a user as when distracted.

If a decision of "NO" results in Step S2, then control moves to Step S12 and the currently displayed item is set, and in the subsequent Step S13 the index number IN is set to 1 and initialized.

In Step S3, the number of frames data Ft corresponding to the pressure-sense value is read from the table. In Step S4, the number of frames FN is incremented by 1, and in Step S5, a decision is made as to whether the number of frames FN is greater than the number of frames Ft read from the table, and if "YES" then control processing moves to Step S6, but if "NO" then control processing moves back to Step S4. The meaning of the processing of this Step S4 is to increment the number of frames FN used for counting up to the number of frames Ft read from the table. The incrementing may be performed once every frame, for example. During this period, the image stored in the video memory of the entertainment system 500 will continue to be displayed. Thus, the same image is displayed for the number of frames corresponding to Ft. Namely, the same item continues to be displayed.

In Step S6, the number of frames FN is set to 0, and in Step S7 the index number IN indicating the item is incremented by 1.

In Step S8, the item corresponding to the index number IN is read from the table shown in FIG. 4.

In Step S9, an image showing the item indicated by the index number IN is overwritten upon a stipulated position in video memory, namely the position corresponding to the item display. The image thus updated is displayed on the television monitor 408.

In Step S10, a decision is made as to whether or not the index number IN is greater than the value of the maximum value $IN_{max}$, and if "YES" then control processing moves to Step S11 where the index number IN is set to 1 and initialized, but if "NO" then control moves back to Step S1.

As described above, in this embodiment, items are displayed one at a time at a rate depending on the pressure-sense value, so it is possible to provide a system with a user interface that is improved in comparison to selection with a simple ON/OFF switch.

It is noted that while the aforementioned example was described regarding the case wherein the displayed item is entered when the pressure-sensing value is more than a stipulated amount less than the previous pressure-sense value, the item may also be entered when a different button of the controller 200 is pressed.

In addition, it is also possible to find the percent change from the previous pressure-sense value to the current pressure-sense value and display an item depending on this percent change. For example, if the previous pressure-sense value is 100 and the current pressure-sense value is 50, then the percent change is 50%, so it is sufficient for the number of frames to be set to twice the previous number of frames.

It is also possible to use a table opposite the table displayed in FIG. 3, namely a table wherein a large number of frames is allocated to low pressure-sense values, so the higher the pressure-sense value, the longer the time until the next item is displayed becomes.

Figure 5B:
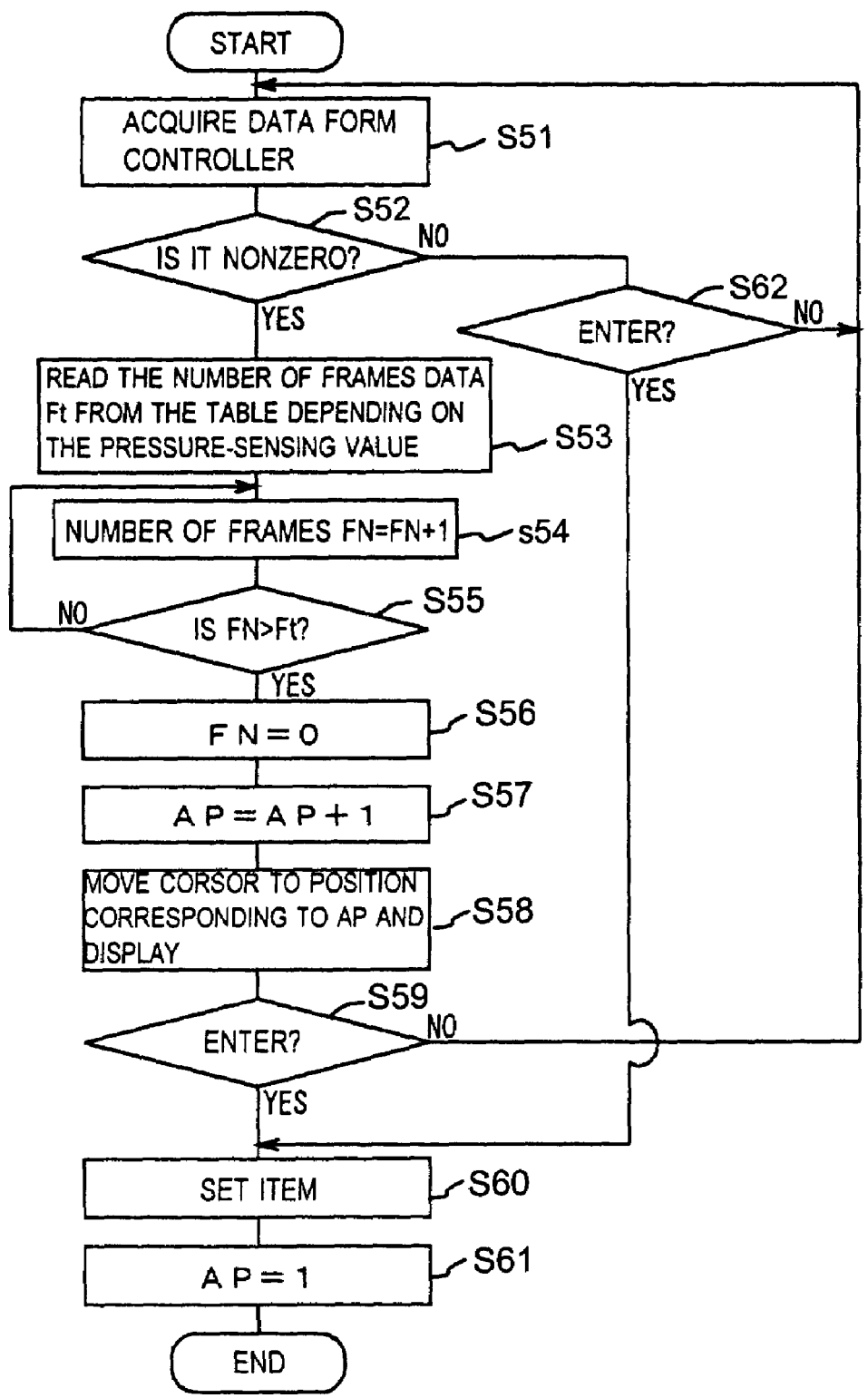

FIG. 5B illustrates the processing of a program for item selection. In FIG. 5B, in Step S51, a pressure-sensing value which is the pushing pressure of the user or operator is acquired, and in Step S52 a decision is made as to whether or not the pressure-sensing value is nonzero, and if "YES" then control processing moves to Step S53 where the number of frames data Ft corresponding to the pressure-sensing value is read from the table shown in FIG. 3.

If a decision of "NO" results in Step S52, then control processing moves to Step S62 where a decision is made as to whether or not the user has confirmed that the currently selected item is to be entered, and if "YES" then control processing moves to Step S60, but if "NO" then control processing moves back to Step S51. The button used for entry may be an ON/OFF switch of the controller 200 or a button connected to the pressure-sensitive device.

In Step S53, the number of frames data Ft corresponding to the pressure-sensing value is read from the table. In Step S54, the number of frames FN is incremented by 1, and in Step S55, a decision is made as to whether the number of frames FN is greater than the number of frames Ft read from the table, and if "YES" then control processing moves to Step S56, but if "NO" then control processing moves back to Step S54.

The meaning of the processing of Step S54 is to increment the number of frames FN used for counting up to the number of frames Ft read from the table. The incrementing may be performed once every frame, for example. During this period, the image stored in the video memory of the entertainment system 500 will continue to be displayed. Thus, the same image is displayed for the number of frames corresponding to Ft.

In Step S56, the number of frames FN is set to 0, and in Step S57 the address pointer AP which indicates the various items within the table is incremented by 1. In Step S58 a cursor image is overwritten to the position in video memory corresponding to the address pointer AP, namely to the position of the corresponding item. The image thus updated is displayed upon the television monitor 408.

In Step S59, a decision of whether to enter the item or not is made, and if "YES" then control processing moves to Step S60, but if "NO" then control processing moves back to Step S1. The decision of whether to enter the item or not in Step S59 is the same as that in Step S62.

In Step S61, the address pointer AP is set to 1 and thus initialized for the next item selection.

As described above, in this embodiment, the selection of items within a menu is performed depending on the pressure-sensing value, so it is possible to improve the user interface compared to selection with a simple on/off switch.

It should be noted that it is also possible to find the percent change from the previous pressure-sensing value to the current pressure-sense value and display an item depending on this percent change. For example, if the previous pressure-sensing value is 100 and the current pressure-sensing value is 50, then the percent change is 50%, so it is sufficient for the number of frames to be set to twice the previous number of frames.

In addition, it is possible to use a table opposite the table displayed in FIG. 3, namely a table wherein a large number of frames is allocated to low pressure-sensing values, so the higher the pressure-sense value, the longer the time for unit movement of the cursor becomes.

In addition, the subject of selection is not limited to items within a menu. For example, an icon or mail address or the like may also be selected depending on the pressure-sensing value. By specifying a certain icon, it is possible to select a program, command, file or the like associated with that icon. In addition, by specifying a mail address, it is possible to select a specific home page on the World Wide Web on the Internet or the like associated with that mail address.

Icons, mail addresses or the like may be specified by using the pressure-sensitive controller to specify icons, mail addresses or the like appearing in order on the monitor, or by using the pressure-sensitive controller to specify icons, mail addresses or the like that are highlighted in order on the monitor.

Figure 6:
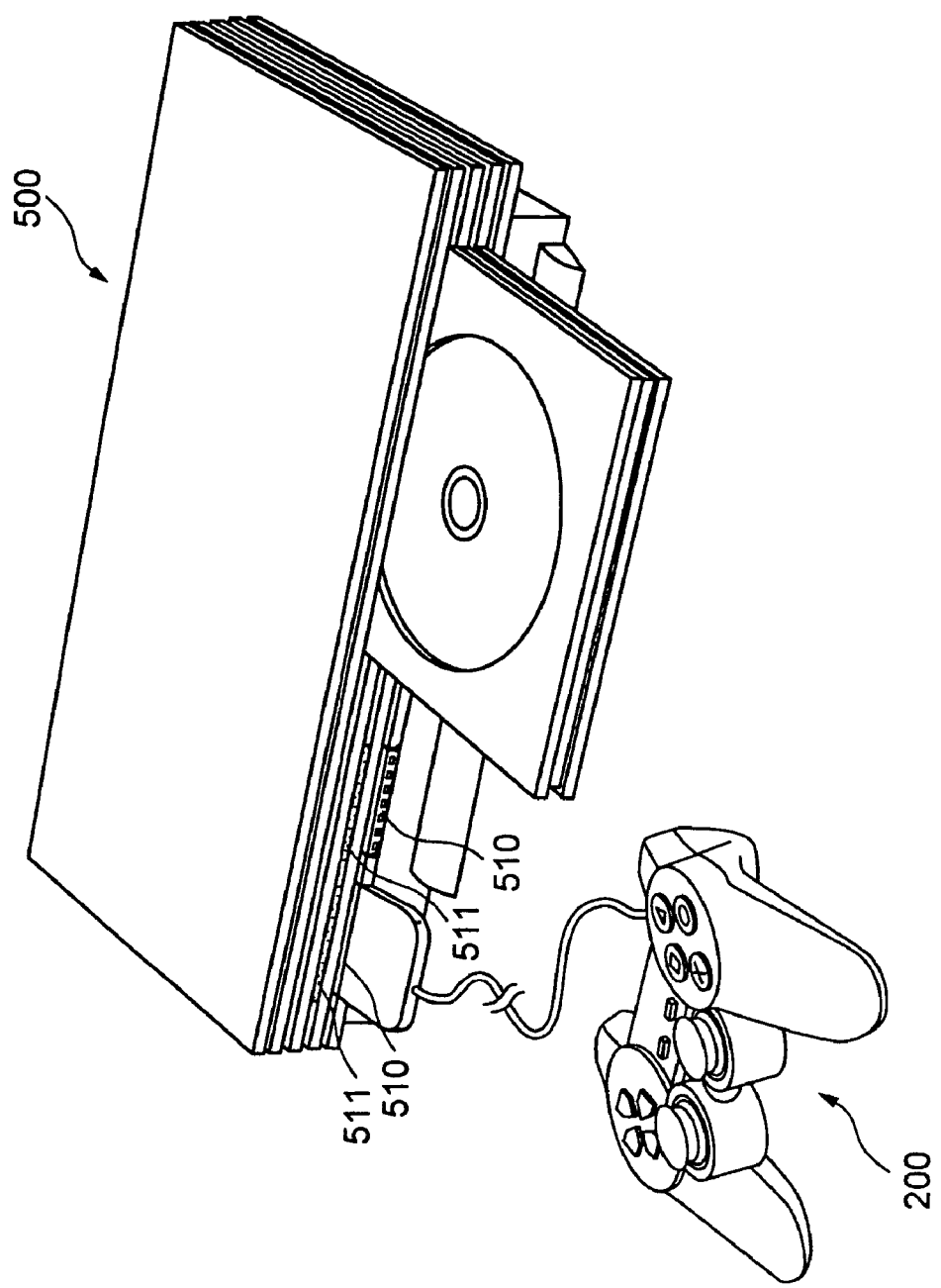
FIG. 6 is a perspective view of the controller connected to the entertainment system.

FIG. 6 is a perspective view showing the controller 200 connected to entertainment system 500. The controller 200 is removably connected to the entertainment system 500, and the entertainment system 500 is connected to television monitor 408.

The entertainment system 500 reads the program for a computer game from recording media upon which that program is recorded and by executing the program, displays characters on the television monitor 408. The entertainment system 500 has various built-in functions for DVD (Digital Versatile Disc) playback, CDDA (compact disc digital audio) playback and the like. The signals from the controller 200 are also processed as one of the aforementioned control functions within the entertainment system 500, and the content thereof may be reflected in the movement of characters and the like, on the television monitor 408.

While this depends also on the content of the computer game program, controller 200 may be allocated functions for moving the characters display on the television monitor 408 in the directions up, down, left or right.

Figure 7:
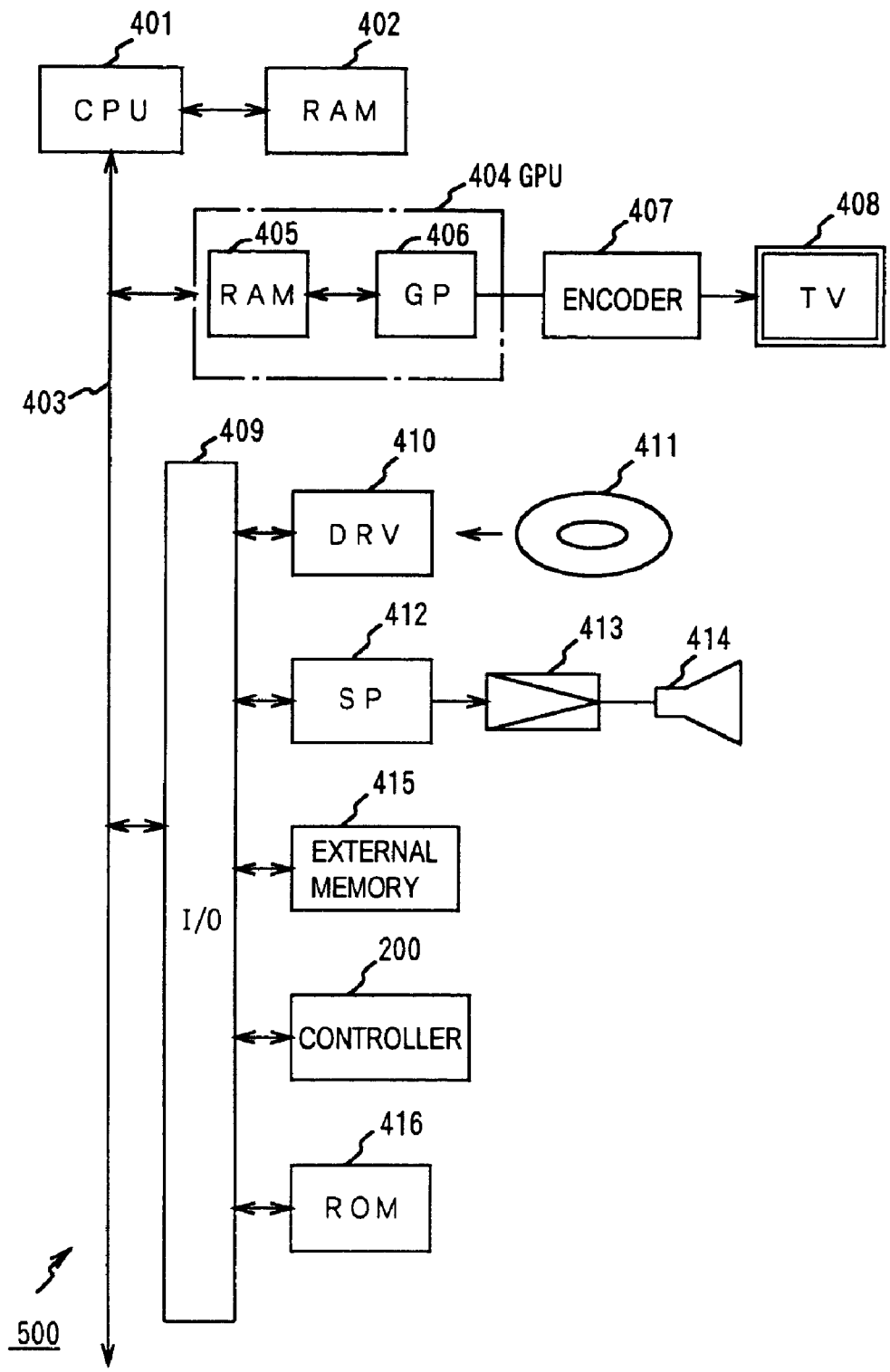
FIG. 7 is a block diagram showing the entertainment system.

With reference to FIG. 7, here follows a description of the interior of the entertainment system 500 shown in FIG. 6. FIG. 7 is a block diagram of the entertainment system 500.

A CPU 401 is connected to RAM 402 and a bus 403, respectively. Connected to bus 403 are a graphics processor unit (GPU) 404 and an input/output processor (I/O) 409, respectively. The GPU 404 is connected via an encoder 407 for converting a digital RGB signal or the like into the NTSC standard television format, for example, to a television monitor (TV) 408 as a peripheral. Connected to the I/O 409 are a driver (DRV) 410 used for the playback and decoding of data recorded upon an optical disc 411, a sound processor (SP) 412, an external memory 415 consisting of flash memory, controller 200 and a ROM 416 which records the operating system and the like. The SP 412 is connected via an amplifier 413 to a speaker 414 as a peripheral.

Here, the external memory 415 may be a card-type memory consisting of a CPU or a gate array and flash memory, which is removably connected via a connector 511 to the entertainment system 500 shown in FIG. 6. The controller 200 is configured such that, when a plurality of buttons provided thereupon are pushed, it gives instructions to the entertainment system 500. In addition, the driver 410 is provided with a decoder for decoding images encoded based upon the MPEG standard.

The description will be made now as to how the images will be displayed on the television monitor 408 based on the operation of controller 200. It is assumed that data for objects consisting of polygon vertex data, texture data and the like recorded on the optical disc 411 is read by the driver 410 and stored in the RAM 402 of the CPU 401.

When instructions from the player via controller 200 are provided as an input to the entertainment system 500, the CPU 401 calculates the three-dimensional position and orientation of objects with respect to the point of view based on these instructions. Thereby, the polygon vertex data for objects defined by X, Y, Z coordinate values are modified variously. The modified polygon vertex data is subjected to perspective conversion processing and converted into two-dimensional coordinate data.

The regions specified by two-dimensional coordinates are so-called polygons. The converted coordinate data, Z data and texture data are supplied to the GPU 404. Based on this converted coordinate data, Z data and texture data, the GPU 404 performs the drawing process by writing texture data sequentially into the Ram 405. One frame of image data upon which the drawing process is completed, is encoded by the encoder 407 and then supplied to the television monitor 408 and displayed on its screen as an image.

Figure 8:
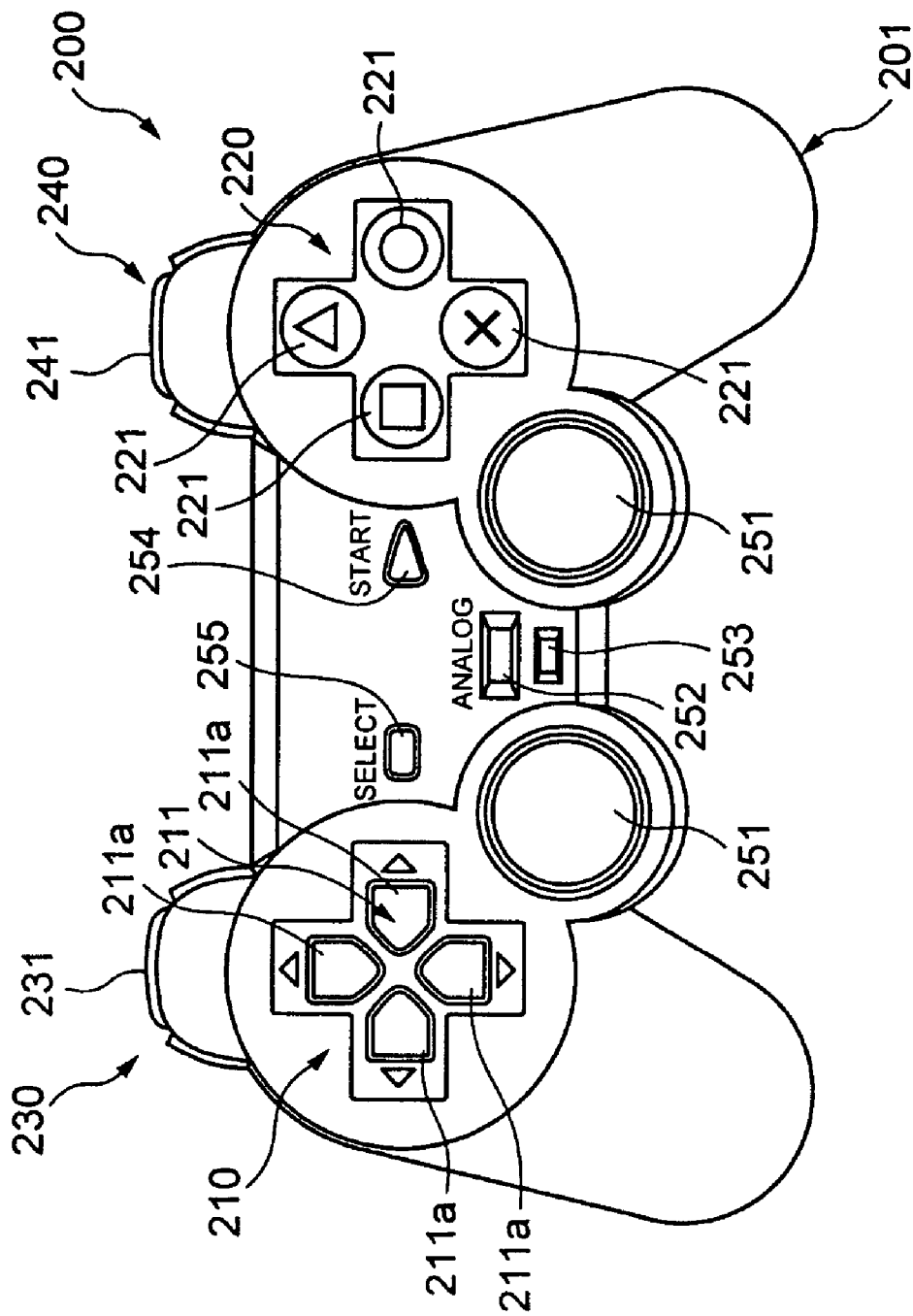
FIG. 8 is a top view of the controller.

FIG. 8 is a top view of controller 200. The controller 200 includes a unit body 201 on the top surface of which are provided first and second control parts 210 and 220, and on the side surface of which are provided third and fourth control parts 230 and 240 of the controller 200.

The first control part 210 of the controller is provided with a cruciform control unit 211 used for pushing control, and the individual control keys 211a extending in each of the four directions of the control unit 211 form a control element. The first control part 210 is the control part for providing movement to the characters displayed on the screen of the television receiver, and has the functions for moving the characters in the up, down, left and right directions by pressing the individual control keys 211a of the cruciform control unit 211.

The second control part 220 is provided with four cylindrical control buttons 221 (control elements) for pushing control. The individual control buttons 221 have identifying marks such as "○" (circle), "□" (cross), "□" (triangle) and "□" (quadrangle) on their tops, in order to easily identify the individual control buttons 221. The functions of the second control part 220 are set by the game program recorded upon the optical disc 411, and the individual control buttons 221 may be allocated functions that change the state of the game characters, for example.

For example, the control buttons 221 may be allocated functions for moving the left arm, right arm, left leg and right leg of the character.

The third and fourth control parts 230 and 240 of the controller have nearly the same structure, and both are provided with two control buttons 231 and 241 (control elements) for pushing control, arranged above and below. The functions of these third and fourth control parts 230 and 240 are also set by the game program recorded upon the optical disc, and may be allocated functions for making the game characters do special actions, for example.

Moreover, two joy sticks 251 for performing analog operation are provided upon the unit body 201 shown in FIG. 8. The joy sticks 251 can be switched and used instead of the first and second control parts 210 and 220 described above. This switching is performed by means of an analog selection switch 252 provided upon the unit body 201. When the joy sticks 251 are selected, a display lamp 253 provided on the unit body 201 lights, indicating the state wherein the joy sticks 251 are selected.

It is to be noted that on unit body 201 there are also provided a start switch 254 for starting the game and a select switch 255 for selecting the degree of difficulty or the like at the start of a game, and the like.

Controller 200 is held by the left hand and the right hand of the user and is operated by the other fingers of the user, and in particular the user's thumbs are able to operate most of the buttons on the top surface.

FIG. 9 and FIGS. 10A–10C are, respectively, an exploded respective view and cross-sectional views showing the second control part of the controller.

Figure 9:
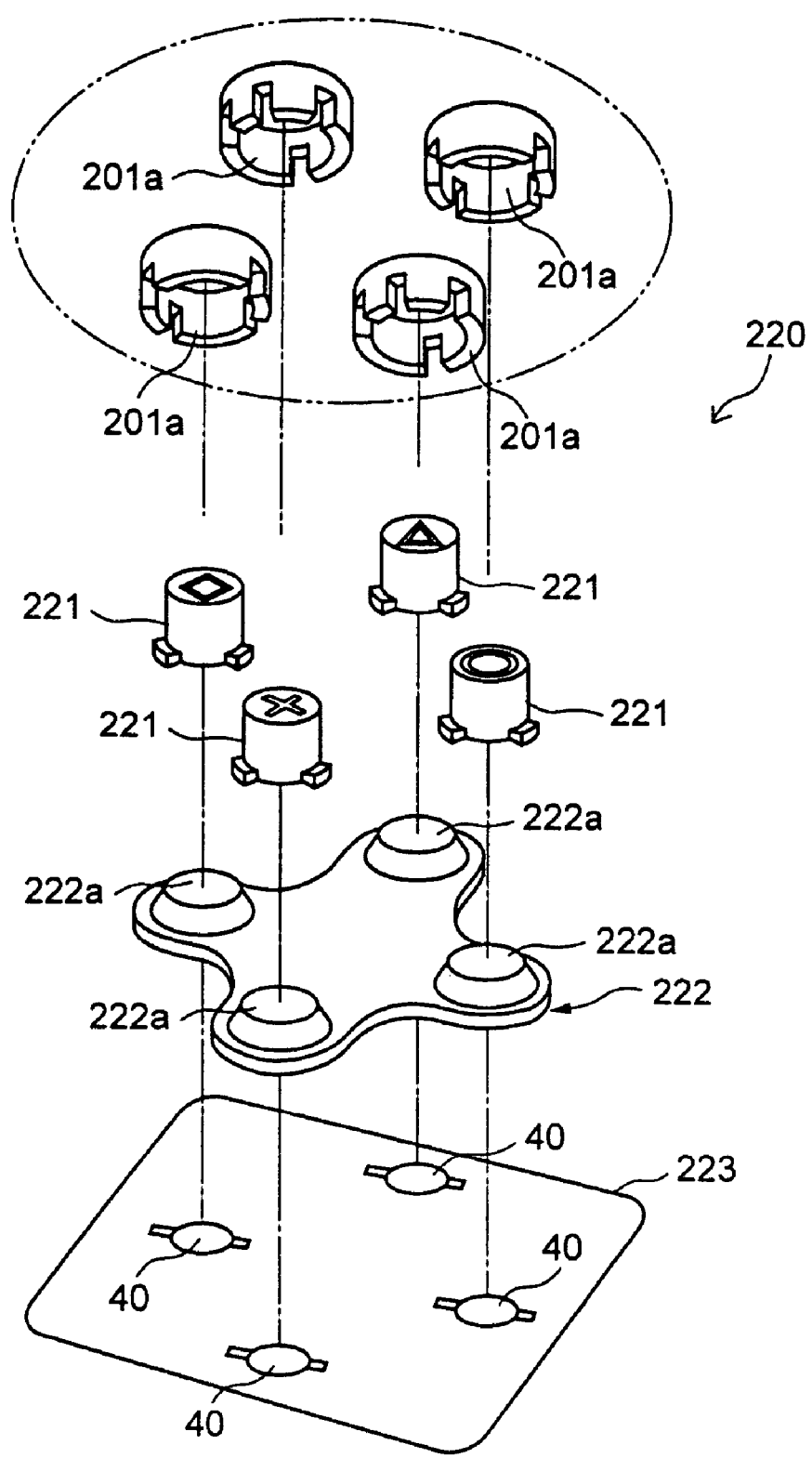
FIG. 9 is an exploded perspective view of an embodiment of the second control part of the controller.

As shown in FIG. 9, the second control part 220 consists of four control buttons 221 which serve as the control elements, an elastic body 222, and a sheet member 223 provided with resistors 40. The individual control buttons 221 are inserted from behind through insertion holes 201a formed on the upper surface of the unit body 201. The control buttons 221 inserted into the insertion holes 201a are able to move freely in the axial direction.

The elastic body 222 is made of insulating rubber or the like and has elastic areas 222a which protrude upward, and the lower ends of the control buttons 221 are supported upon the upper walls of the elastic areas 222a. When the control buttons 221 are pressed, the inclined-surface portions of these elastic areas 222a flex so that the upper walls move together with the control buttons 221.

Figure 10A:
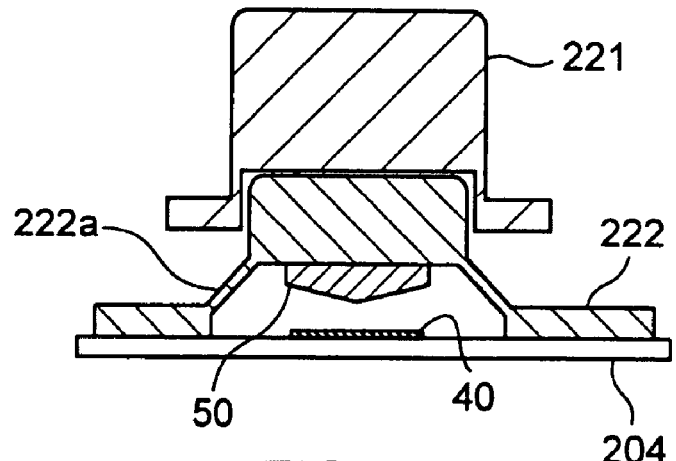
FIGS. 10A-10C are cross-sectional views of the second control part of the controller of FIG. 9.
Figure 10B:
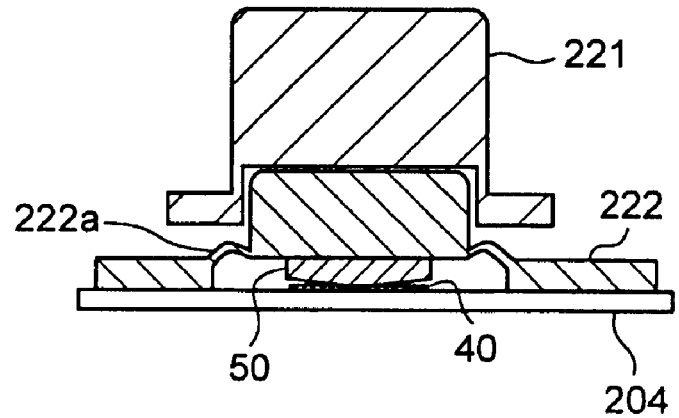
Figure 10C:
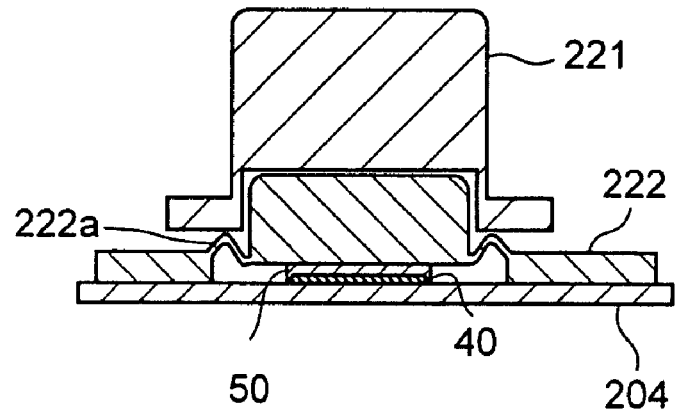

On the other hand, when the pushing pressure on the control buttons 221 is released, the flexed inclined-surface portions of elastic areas 222a elastically return to their original shape, pushing up the control buttons 221. The elastic body 222 functions as a spring means whereby control buttons 221 which had been pushed in by a pushing action are returned to their original positions. As shown in FIGS. 10A–10C, conducting members 50 are attached to the rear surface of the elastic body 222.

The sheet member 223 consists of a membrane or other thin sheet material which has flexibility and insulating properties. Resistors 40 are provided in appropriate locations on this sheet member 223 and these resistors 40 and conducting member 50 are each disposed such that they face one of the control buttons 221 via the elastic body 222. The resistors 40 and conducting members 50 form pressure-sensitive devices. These pressure-sensitive devices consisting of resistors 40 and conducting members 50 have resistance values that vary depending on the pushing pressure received form the control buttons 221.

To describe this in more detail, as shown in FIGS. 10A–10C, the second control part 220 is provided with control buttons 221 as control elements, an elastic body 222, conducting members 50 and resistors 40. Each conducting member 50 may be made of conductive rubber which has elasticity, for example, and has a conical shape with its center as a vertex. The conducting members 50 are adhered to the inside of the top surface of the elastic areas 222a formed in the elastic body 222.

In addition, the resistors 40 may be provided on an internal board 204, for example, opposite the conducting members 50, so that the conducting members 50 come into contact with resistors 40 together with the pushing action of the control buttons 221. The conducting member 50 deforms, depending on the pushing force on the control button 221 (namely the contact pressure with the resistor 40), so as shown in FIGS. 10B and 10C, the surface area in contact with the resistor 40 varies depending on the pressure. To wit, when the pressing force on the control button 221 is weak, as shown in FIG. 10B, only the area near the conical tip of the conducting member 50 is in contact. As the pressing force on the control button 221 becomes stronger, the tip of the conducting member 50 deforms gradually so the surface area in contact expands.

Figure 11:
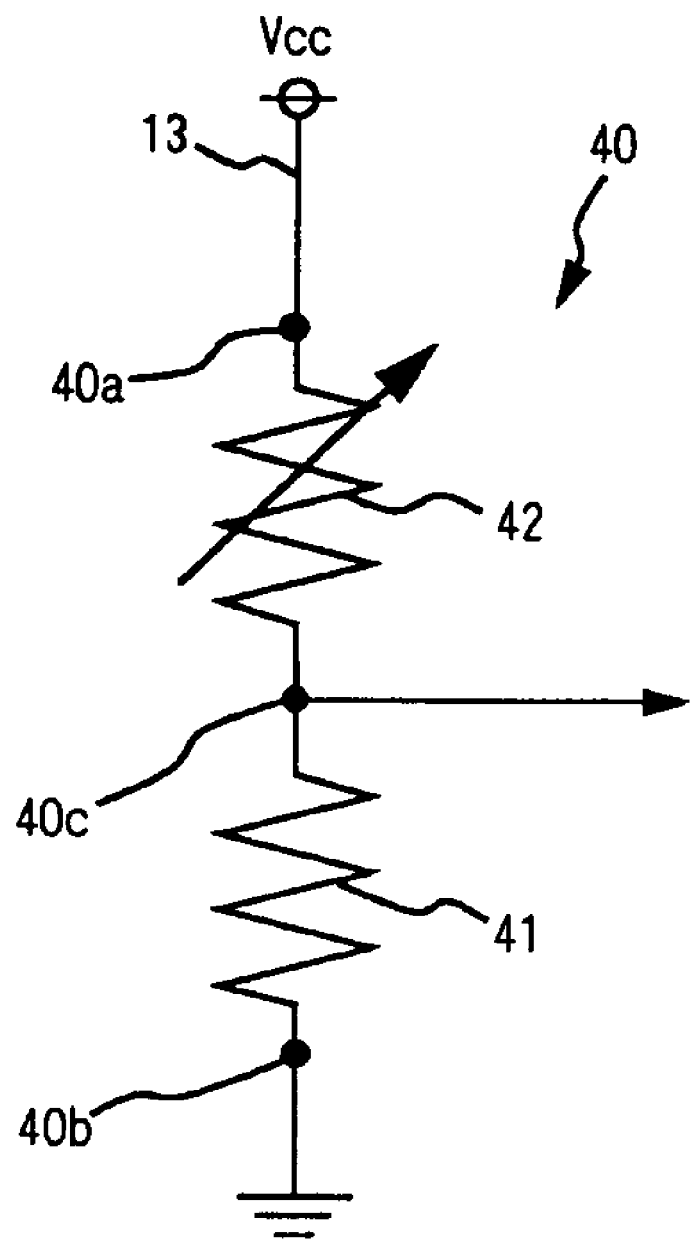
FIG. 11 is a diagram showing an equivalent circuit for a pressure-sensitive device of the controller.

FIG. 11 shows an equivalent circuit for a pressure-sensitive device consisting of a resistor 40 and conducting member 50. As shown in this diagram, the pressure-sensitive device is inserted in series in a power supply line 13, where the voltage $V_{cc}$ is applied between the electrodes 40a and 40b. As shown in this diagram, the pressure-sensitive device is divided into a variable resistor 42 that has the relatively small resistance value of the conducting member 50, and a fixed resistor 41 that has the relatively large resistance value of the resistor 40. Among these, the portion of the variable resistor 42 is equivalent to the portion of resistance in the contact between the resistor 40 and the conducting member 50, so the resistance value of the pressure-sensitive device varies depending on the surface area of contact with the conducting member 50.

When the conducting member 50 comes into contact with the resistor 40, in the portion of contact, the conducting member 50 becomes a bridge instead of the resistor 40 and a current flows, so the resistance value becomes smaller in the portion of contact. Therefore, the greater the surface area of contact between the resistor 40 and conducting member 50, the lower the resistance value of the pressure-sensitive device becomes. In this manner, the entire pressure-sensitive device can be understood to be a variable resistor. It should be noted that FIGS. 10A–10C show only the contact portion between the conducting member 50 and resistor 40 which forms the variable resistor 42 of FIG. 11, but the fixed resistor 41 of FIG. 12 is omitted from FIG. 15.

In the preferred embodiment, an output terminal is provided near the boundary between the variable resistor 42 and fixed resistor 41, namely near the intermediate point of the resistors 40, and thus a voltage stepped down from the applied voltage $V_{cc}$ by the amount the variable resistance is extracted as an analog signal corresponding to the pushing pressure of the user on the control button 221.

First, since a voltage is applied to the resistor 40 when the power is turned on, even if the control button 221 is not pressed, a fixed analog signal (voltage) $V_{min}$ is provided as the output from the output terminal 40c. Next, even if the control button 221 is pressed, the resistance value of this resistor 40 does not change until the conducting member 50 contacts the resistor 40, so the output from the resistor 40 remains unchanged at $V_{min}$. If the control button 221 is pushed further and the conducting member 50 comes into contact with the resistor 40, the surface area of contact between the conducting member 50 and the resistor 40 increases in response to the pushing pressure on the control button 221, and thus the resistance of the resistor 40 is reduced so the analog signal (voltage) output from the output terminal 40c of the resistor 40 increases. Furthermore, the analog signal (voltage) output form the output terminal 40c of the resistor 40 reaches the maximum $V_{max}$ when the conducting member 50 is most deformed.

Figure 12:
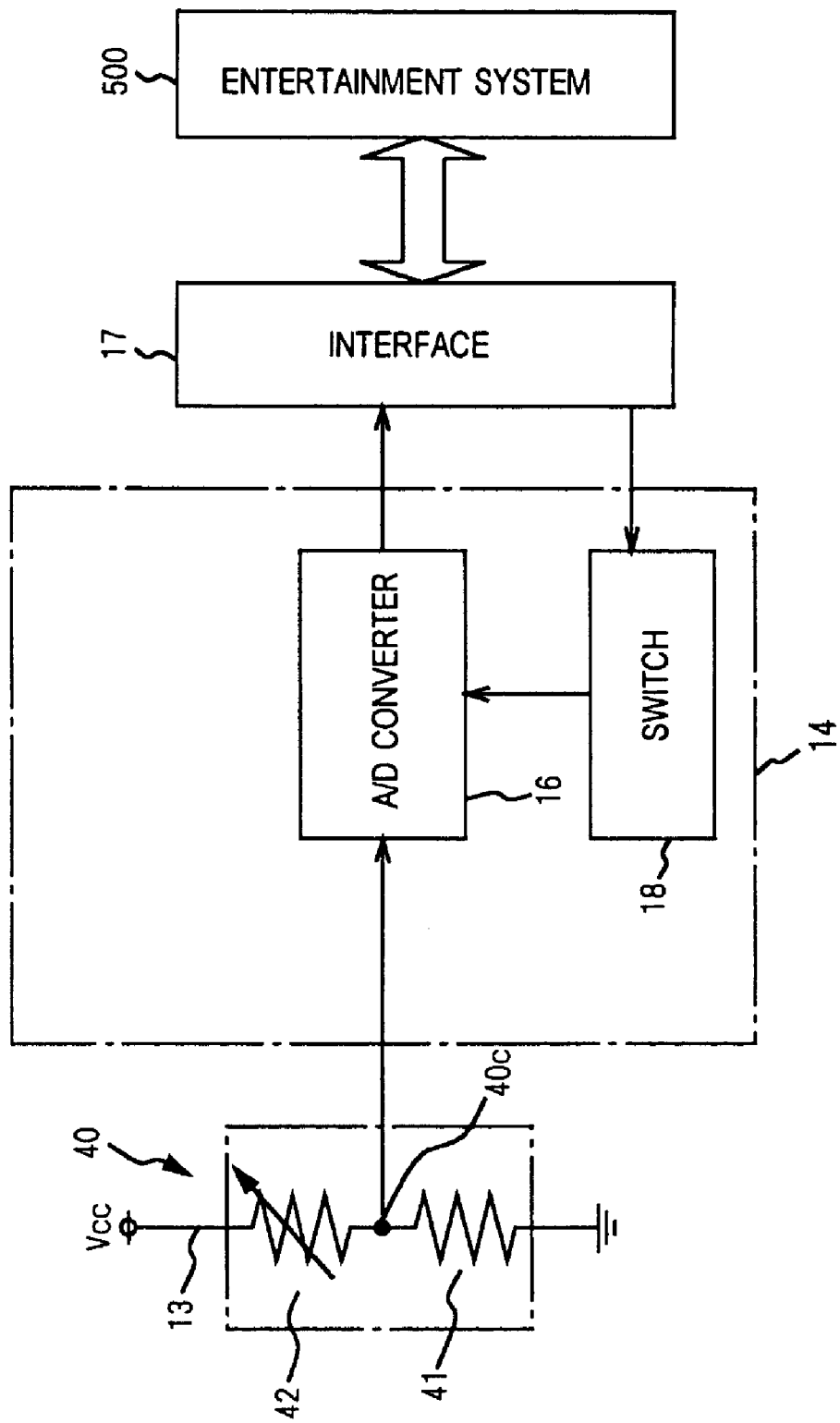
FIG. 12 is a block diagram of the main parts of the controller.

FIG. 12 is a block diagram showing the main parts of the controller 200.

An MPU 14 mounted on the internal board of the controller 200 is provided with a switch 18, an A/D converter 16 and two vibration generation systems. The analog signal (voltage) output from the output terminal 40c of the resistor 40 is provided as the input to the A/D converter 16 and is converted to a digital signal.

The digital signal output from the A/D converter 16 is sent via an interface 17 provided upon the internal board of the controller 200 to the entertainment system 500 and the actions of game characters and the like are executed based on this digital signal.

Changes in the level of the analog signal output from the output terminal 40c of the resistor 40 correspond to changes in the pushing pressure received form the control button 221 (control element) as described above. Therefore, the digital signal outputted from the A/D converter 16 corresponds to the pushing pressure on the control button 221 (control element) from the user. If the actions of the game characters and the like are controlled based on the digital signal that has such a relationship with the pushing pressure from the user, it is possible to achieve smoother and more analog-like action than with control based on a binary digital signal based only on zeroes and ones.

The configuration is such that the switch 18 is controlled by a control signal sent from the entertainment system 500 based on a game program recorded on an optical disc 411. When a game program recorded on optical disc is executed by the entertainment system 500, depending on the content of the game program, a control signal is provided as output to specify whether the A/D converter 16 is to function as a means of providing output of a multi-valued analog signal, or as a means of providing a binary digital signal. Based on this control signal, the switch 18 is switched to select the function of the A/D converter 16.

Figure 13:
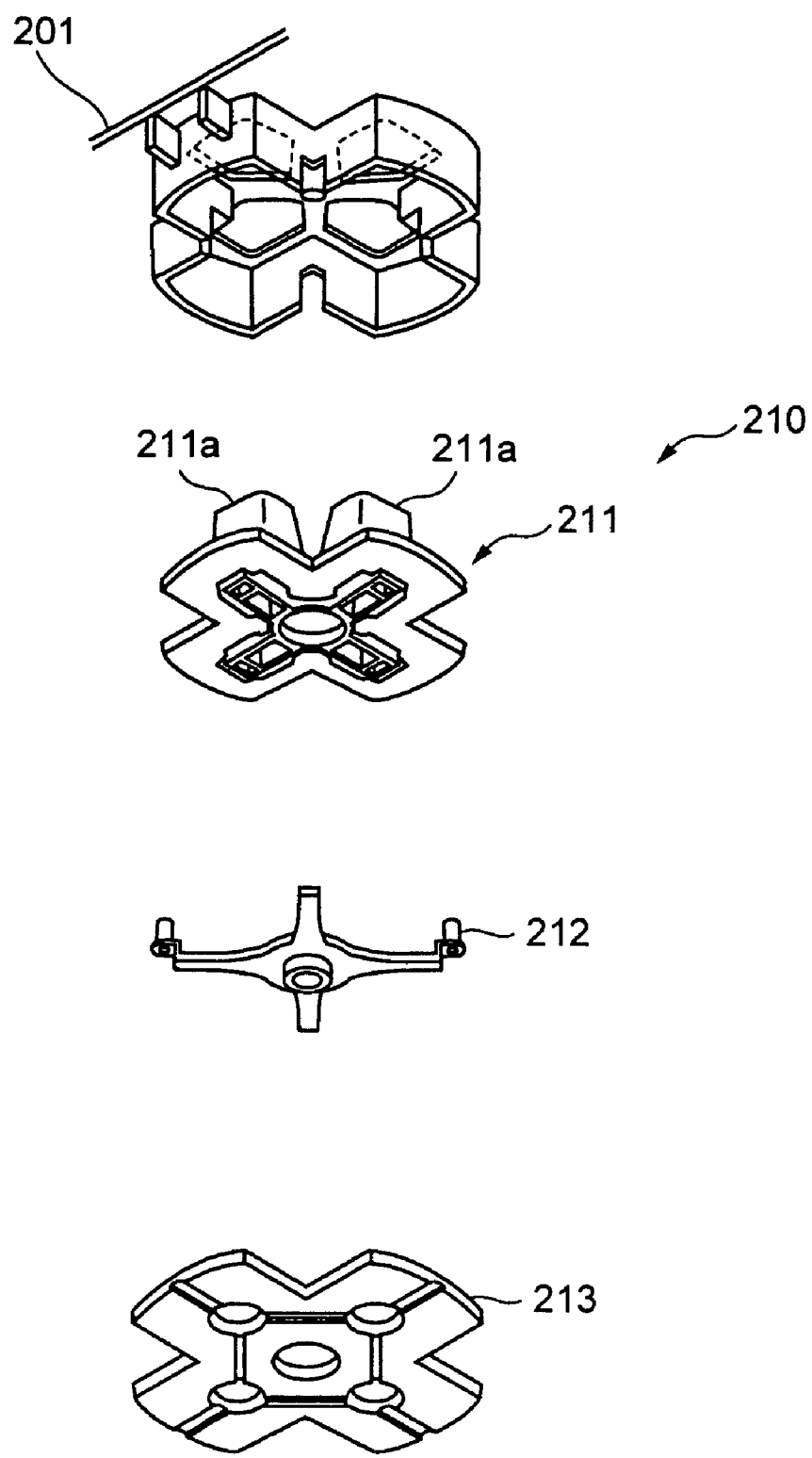
FIG. 13 is an exploded perspective view of an embodiment of the first control part of the controller.
Figure 14:
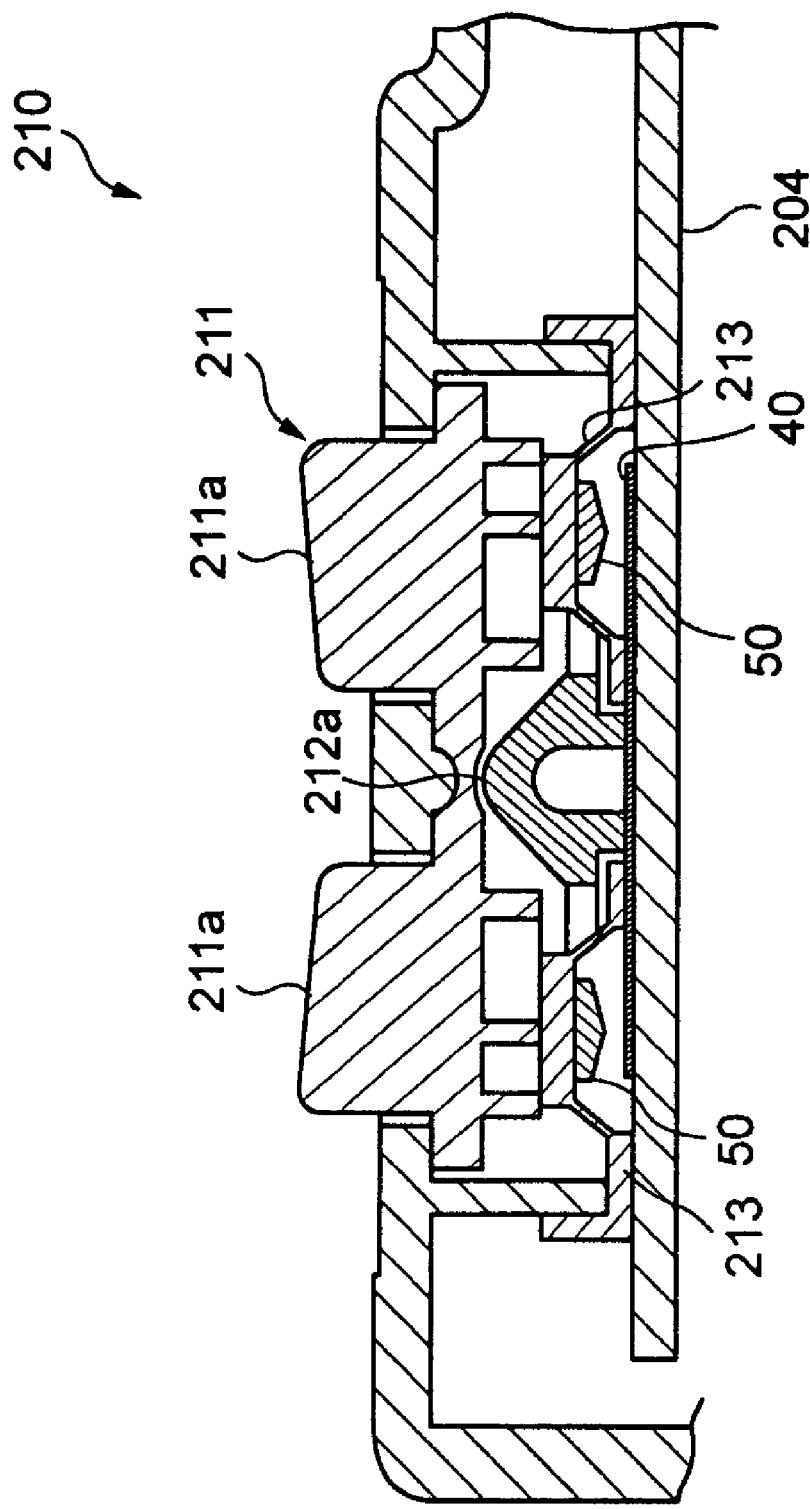
FIG. 14 is a cross sectional view of the first control part of the controller of FIG. 13.

FIGS. 13 and 14 show an embodiment of the configuration of the first control part of the controller.

As shown in FIG. 13, the first control part 210 includes a cruciform control unit 211, a spacer 212 that positions this control unit 211, and an elastic body 213 that elastically supports the control unit 211. Moreover, as shown in FIG. 13, a conducting member 50 is attached to the rear surface of the elastic body 213, and the configuration is such that resistors 40 are disposed at the positions facing the individual control keys 211a (control elements) of the control unit 211 via the elastic body 213.

The overall structure of the first control part 210 has already been made public knowledge in the publication of unexamined Japanese patent application No. JP-A-H8-163672. The control unit 211, however, uses a hemispherical projection 212a formed in the center of the spacer 212 as a fulcrum, and the individual control keys 211a (control elements) are assembled such that they can push on the resistor 40 side (see FIG. 14).

Conducting members 50 are adhered to the inside of the top surface of the elastic body 213 in positions corresponding to the individual control keys 211a (control elements) of the cruciform control unit 211. In addition, the resistors 40 with a single structure are disposed such that they face the individual conducting members 50.

When the individual control keys 211a which are control elements are pushed, the pushing pressure acts via the elastic body 213 on the pressure-sensitive devices consisting of a conducting member 50 and resistor 40, so that its electrical resistance value varies depending on the magnitude of the pushing pressure.

Figure 15:
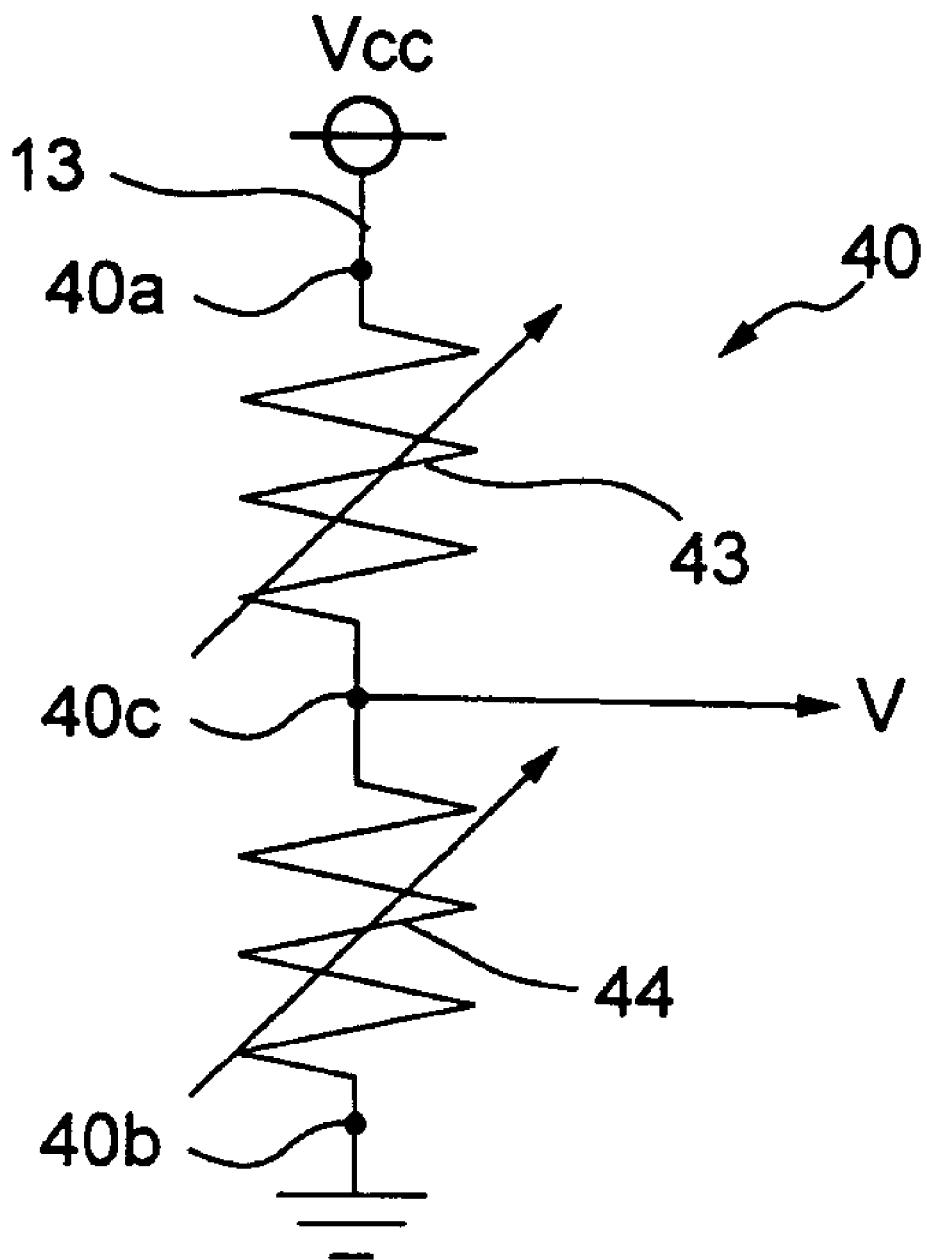
FIG. 15 is a diagram showing the circuit configuration of a resistor.

FIG. 15 is a diagram showing the circuit configuration of the resistor. As shown in this diagram, the resistor 40 is inserted in series in a power supply line 13, where a voltage is applied between the electrodes 40a and 40b. The resistance of this resistor 40 is illustrated schematically, as shown in this diagram; the resistor 40 is divided into first and second variable resistors 43 and 44. Among these, the portion of the first variable resistor 43 is in contact, respectively, with the conducting member 50 that moves together with the control key (up directional key) 211a for moving the character in the up direction, and with the conducting member 50 that moves together with the control key (left directional key) 211a for moving the character in the left direction, so its resistance value varies depending on the surface area in contact with these conducting members 50.

In addition, the portion of the second variable resistor 44 is in contact, respectively, with the conducting member 50 that moves together with the control key (down directional key) 211a for moving the character in the down direction, and with the conducting member 50 that moves together with the control key (right directional Key) 211a for moving the character in the right direction, so its resistance value varies depending on the surface area in contact with these conducting members 50.

Moreover, an output terminal 40c is provided intermediate between the variable resistors 43 and 44, and an analog signal corresponding to the pushing pressure on the individual control keys 211a (control elements) is providing as output from this output terminal 40c.

The output from the output terminal 40c can be calculated from the ratio of the split in resistance value of the first and second variable resistors 43 and 44. For example, if R1 is the resistance value of the first variable resistor 43, R2 is the resistance value of the second variable resistor 44 and $V_{cc}$ is the power supply voltage, then the output voltage V appearing at the output terminal 40c can be expressed by the following equation.

$$V = V_{cc} \times R2/(R1+R2)$$

Therefore, when the resistance value of the first variable resistor 43 decreases, the output voltage increases, but when the resistance value of the second variable resistor 44 decreases, the output voltage also decreases.

Figure 16:
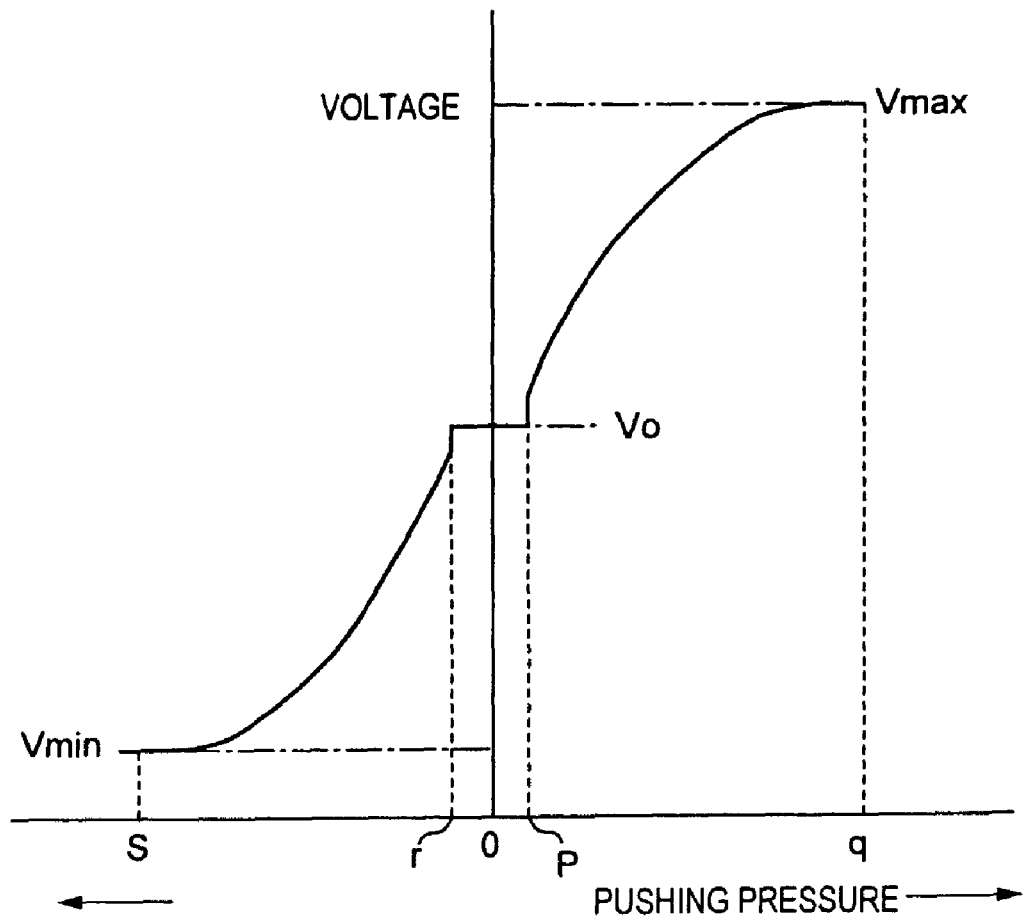
FIG. 16 is a graph showing the characteristic of the signal output.

FIG. 16 is a graph showing the characteristic of the analog signal (voltage) outputted from the output terminal of the resistor.

First, since a voltage is applied to the resistor 40 when the power is turned on, even if the individual control keys 211a of the control unit 211 are not pressed, a fixed analog signal (voltage) $V_0$ is provided as output form the output terminal 40c (at position 0 in the graph).

Next, even if one of the individual control keys 221a is pressed, the resistance value of this resistor 40 does not change until the conducting member 50 contacts the resistor 40, and the output from the resistor 40 remains unchanged at $V_0$.

Furthermore, if the up-directional key or left-directional key is pushed until the conducting member 50 comes into contact with the first variable resistor 43 portion of the resistor 40 (at position p in the graph), thereafter the surfaced area of contact between the conducting member 50 and the first variable resistor 43 portion increases in response to the pushing pressure on the control key 221a (control elements), and thus the resistance of that portion is reduced so the analog signal (voltage) output from the output terminal 40c of the resistor 40 increases. Furthermore, the analog signal (voltage) output form the output terminal 40c of the resistor 40 reaches the maximum $V_{max}$ when the conducting member 50 is most deformed (at position q in the graph).

On the other hand, if the down-directional key or right-directional key is pushed until the conducting member 50 comes into contact with the second variable resistor 44 portion of the resistor 40 (at position r in the graph), thereafter the surface area of contact between the conducting member 50 and the second variable resistor 44 portion increases in response to the pushing pressure on the control key 211a (control elements), and thus the resistance of that portion is reduced, and as a result, the analog signal (voltage) output from the output terminal 40c of the resistor 40 decreases.

Furthermore, the analog signal (voltage) output form the output terminal 40c of the resistor 40 reaches the minimum $V_{min}$ when the conducting member 50 is most deformed (at position s in the graph).

Figure 17:
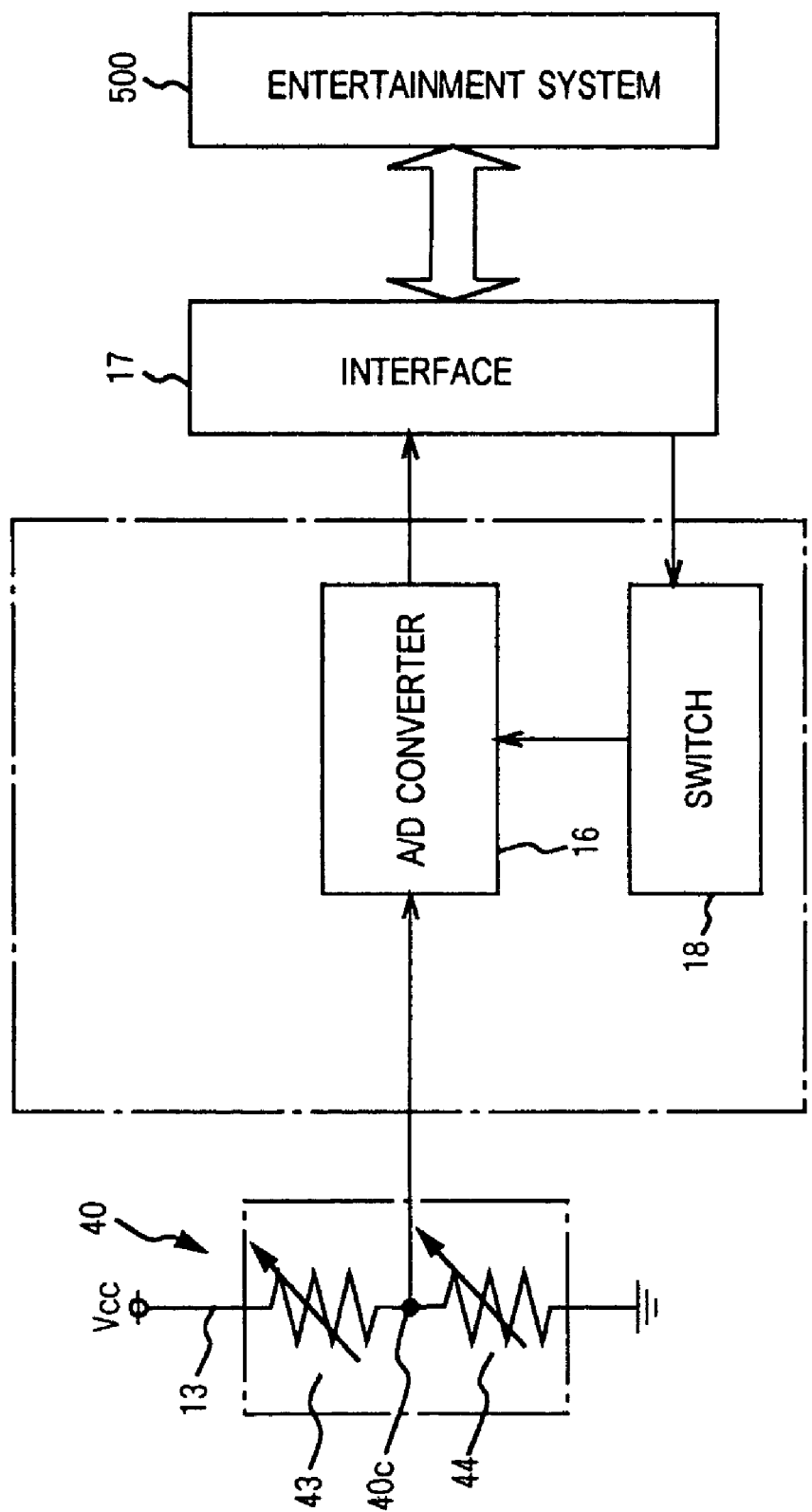
FIG. 17 is a block diagram showing the overall constitution including the resistor.

As shown in FIG. 17, the analog signal (voltage) output from the output terminal 40c of the resistor 40 is provided as input to an A/D converter 16 and converted to a digital signal. Note that the function of the A/D converter 16 is shown in FIG. 17 is as described previously based on FIG. 12, so a detailed description shall be omitted here.

Figure 18:
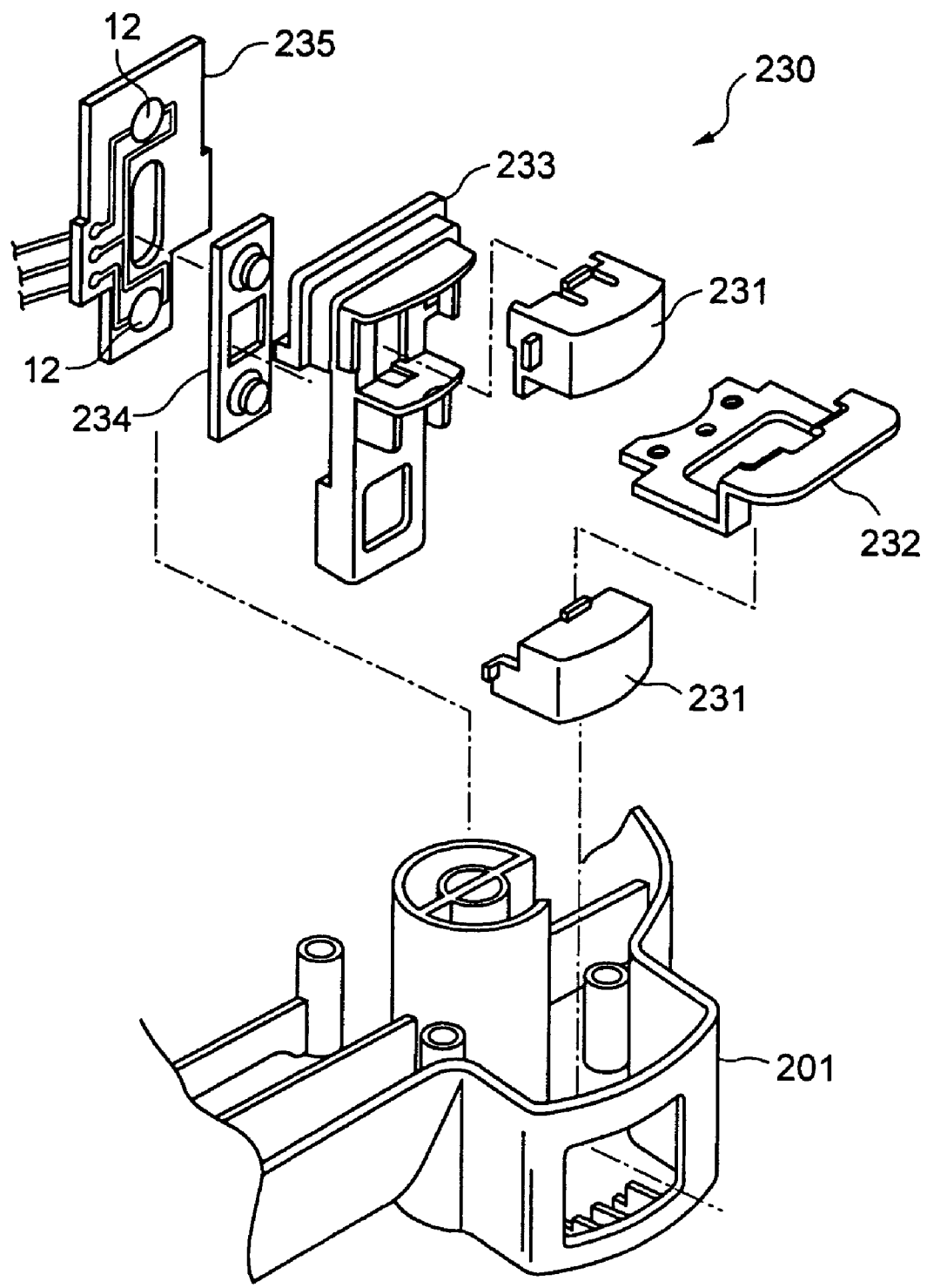
FIG. 18 is an exploded perspective drawing view of the third control part of the controller.

FIG. 18 is an exploded perspective view of the third control part of the controller.

The third control part 230 consists of two control buttons 231, a spacer 232 for positioning these control buttons 231 within the interior of the controller 200, a holder 233 that supports these control buttons 231, an elastic body 234 and an internal board 235, having a structure wherein resistors 40 are attached to appropriate locations upon the internal board 235 and conducting members 50 are attached to the rear surface of the elastic body 234.

The overall structure of the third control part 230 also already has been made public knowledge in the publication of unexamined Japanese patent application No. JP-A-H8-163672, so a detailed description thereof will be omitted.

The individual control buttons 231 can be pushed in while being guided by the spacer 232, the pushing pressure when pressed acts via the elastic body 234 on the pressure-sensitive device consisting of a conducting member 50 and resistor 40. The electrical resistance value of the pressure-sensitive device varies depending on the magnitude of the pushing pressure it receives.

It is noted that the fourth control part 240 has the same structure as that of the third control part 230 described above.

In the aforementioned description, flowchart for displaying items are shown in FIGS. 5A, 5B. This program may be supplied either recorded alone upon an optical disc or other recording medium, or recorded upon said recording medium together with the game software as part of the game software.

This program is run by the entertainment system 500 and executed by its CPU. The meaning of supplying this program for item selection recorded individually on a recording medium has the meaning of preparing them in advance as a library for software development. As is common knowledge, at the time of developing software, writing all functions requires an enormous amount of time.

However, if the software functions are divided by the type of function, for example, for moving objects and the like, they can be used commonly by various types of software, so more functions can be included.

To this end, a function such as that described in this preferred embodiment that can be used commonly may be provided to the software manufacturer side as a library program. When general functions like this are supplied as external programs in this manner, it is sufficient for the software manufacturers to write only the essential portions of the software.

While an embodiment was described above, the present invention may also assume the following alternative embodiment. In the embodiment described, the pressure-sensing value as pushed by the user is used as is. However, in order to correct for differences in the body weights of users or differences in how good their reflexes are, it is possible to correct the maximum value of the user pressure-sensing value to the maximum game pressure-sensing value set by the program, and intermediate values may be corrected proportionally and used. This type of correction is performed by preparing a correction table. In addition, the user pressure-sensing value can be corrected based upon a known function. Moreover, the maximum value of the user pressure-sensing value rate of change may be corrected to the maximum game pressure-sensing value rate of change set in the program, and intermediate values can be proportionally corrected and used. For more details about this method, refer to the present inventors' Japanese patent application No. 2000-40257 and the corresponding PCT application JP/(Applicant's file reference No. SC00097WO00).

The recording medium, computer and method of selecting computer display items according to this invention permits the selection and entry of an item by the pushing of cursor keys, return keys or other simple ON/OFF switches to be made an easier-to-use interface for the user.

What is claimed is:

1. A method of sequentially displaying each of a plurality of items as a selectable item on a screen of a computer, said computer including a controller which has pressure-sensitive means, comprising the steps of:
   acquiring a pressure-sensing output from said controller,
   determining a display rate for sequentially displaying selectable items on the screen, said display rate being dependent on a value of said pressure-sensing output; and
   sequentially displaying each of the plurality of items as the selectable item at the determined display rate;
   wherein each of the plurality of items is associated with one of a plurality of ordered pointer values or one of a plurality of ordered index values, and
   wherein the step of sequentially displaying each of the plurality of items as the selectable item further comprises the step of:
   incrementing a current pointer value or a current index value to identify a next selectable item.

2. The method as claimed in claim 1, wherein at most one of the plurality of items is displayed on the screen as the selectable item at any point in time.

3. The method as claimed in claim 1, wherein more than one of the plurality of items is displayed on the screen at a point in time, and each of the displayed items is sequentially highlighted at the determined display rate as the selectable item.

4. The method as claimed in claim 3, wherein the selectable item is highlighted by a cursor.

5. The method as claimed in claim 1. wherein said determined display rate is proportional to the value of said pressure-sensing output.

6. The method as claimed in claim 5, wherein said determined display rate increases with an increase in the value of said pressure-sensing output.

7. The method as claimed in claim 5, wherein said determined display rate decreases with an increase in the value of said pressure-sensing output.

8. The method as claimed in claim 5, wherein said determined display rate decreases with a decrease in the value of said pressure-sensing output.

9. The method as claimed in claim 1, wherein said determined display rate is defined by a number of screen frames per second.

10. The method as claimed in claim 1, wherein the value of said pressure-sensing output determines an amount of time that a selectable item is displayed on said screen before a next sequentially displayed selectable item is displayed on said screen.

11. The method as claimed in claim 10, wherein the value of said pressure-sensing output further determines a number of selectable items that are sequentially displayed during a given time period.

12. The method as claimed in claim 1, wherein the current index value identifies an image to be displayed as the selectable item.

13. The method as claimed in claim 1, wherein the current pointer identifies a display position for highlighting a selectable item.

14. The method as claimed in claim 13, wherein the selectable item is highlighted by a cursor.

15. The method as claimed in claim 1, wherein said pressure-sensing output defines a number of pointer values or a number of index values to be incremented during a given time period.

16. The method as claimed in claim 1, wherein said pressure-sensing output determines a last pointer value or a last index value to applied during a given time period.

17. The method as claimed in claim 2, wherein each sequentially displayed selectable item is displayed at the same location on the screen.

18. The method as claimed in claim 1, further comprising the step of:
   selecting a displayed selectable item.

19. The method as claimed in claim 18,
   wherein said pressure sensitive means from said controller further comprises a first pressure sensitive member and a second switch member, wherein said determined display rate is dependent on an output from said first pressure sensitive member, and wherein said displayed selectable item is selected in response to an output from said second switch member.

20. A recording medium on which is recorded a computer-readable and executable software program that performs processing by taking as instructions an output from a controller of a computer, said controller having pressure-sensitive means for sensing a pushing pressure of a user of the computer on the controller in order to generate the output from said controller, wherein said software program comprises:

a processing program that sequentially displays each of a plurality of items as a selectable item on a screen of The computer by:

acquiring a pressure-sensing output from said controller;

determining a display rate for sequentially displaying selectable items on the screen, said display rate being dependent on said pressure-sensing output; and sequentially displaying each of the plurality of items as the selectable item at the determined display rate;

wherein each of the plurality of items is associated with one of a plurality of ordered pointer values or one of a plurality of ordered index values, and wherein the step of sequentially displaying each of the plurality of items as the selectable item further comprises the step of:

incrementing a current pointer value or a current index value to identify a next selectable item.

21. A computer comprising:

a controller having pressure-sensitive means for sensing a pushing pressure of a user on the controller and generating a pressure sensing output;

a display screen;

means for monitoring the pressure-sensing output from the controller;

means for determining a display rate for sequentially displaying selectable items on the display screen, said display rate being dependent on a value of said pressure-sensing output; and means for sequentially displaying each of the plurality of items on the display screen as the selectable item at the determined display rate;

wherein each of the plurality of items is associated with one of a plurality of ordered pointer values or one of a plurality of ordered index values, and wherein the step of sequentially displaying each of the plurality of items as the selectable item further comprises the step of:

incrementing a current pointer value or a current index value to identify a next selectable item.

22. The computer as claimed in claim 20, wherein said pressure sensitive means from said controller includes a first pressure sensitive member and a second switch member, and said means for determining a display rate is dependent on an output from said first pressure sensitive member, the computer further including:

means for detecting an output from said second switch member; and means for selecting a displayed selectable item by detecting an output from said second switch member.

23. The method as claimed in claim 1, wherein:

selecting each selectable item makes a connection to a target including one of a program command, file, web address, and mail address; and each selectable item is associated with a different target than each other selectable item.

* * * * *